Oct. 4, 1927.
C. MARCUS
1,644,438
SHOCK ABSORBER FOR VEHICLES
Original Filed Nov. 10, 1922
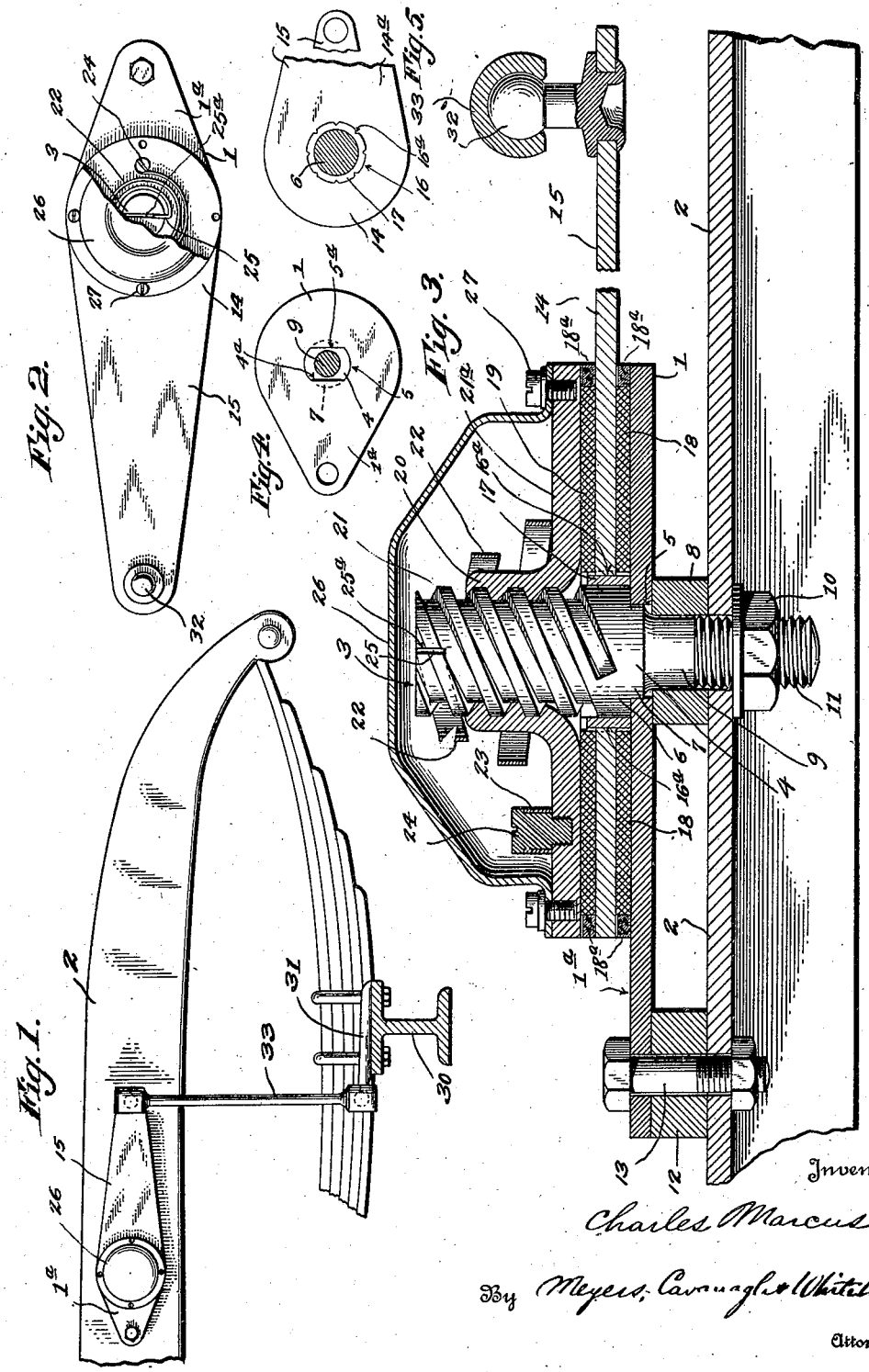
Inventor
Charles Marcus
By Meyers, Cavanagh & Whitehead,
Attorneys Patented Oct. 4, 1927.

1,644,438

UNITED STATES PATENT OFFICE.

CHARLES MARCUS, OF NEW YORK, N. Y., ASSIGNOR OF ONE-THIRD TO RAYMOND P. LANSING, OF MONTCLAIR, NEW JERSEY, AND ONE-THIRD TO HAROLD D. CHURCH, OF FAIRFIELD, CONNECTICUT.

SHOCK ABSORBER FOR VEHICLES.

Application filed November 10, 1922, Serial No. 600,082. Renewed March 3, 1927.

The invention relates to devices for retarding the movement of vehicle springs; or otherwise stated, for checking or retarding the movement of the main frame of the vehicle in relation to the axle due to road surface irregularities.

The invention structure is especially advantageous for use to retard the recoil movement of the vehicle springs, but may also be employed when desired, to check the spring compression, or movement of the axle toward the chassis frame.

Important objects of the invention are, to provide a mechanism which dispenses with fluid media and acts with certainty to apply a predetermined frictional resistance to the relative frame-and-axle movement in one direction without opposing any appreciable resistance to the other movement; to apply the maximum desirable or available resistance throughout all but a small part of the retarded movement; to provide a small range of substantially free initial spring movement, that is, at the beginning of the convergent or divergent movement of vehicle frame and axle, as the case may be; to construct and arrange the mechanism so that the free range of movement is automatically provided for at the beginning of the retarded spring movement in any of the relative positions of the vehicle frame and axle; to apply the maximum resistance very rapidly or practically immediately at the end of the short free movement; to dispense with straps or bands, either as friction members or connections; to provide a simple, strong and durable mechanism; and in various ways to improve the structure and functional characteristics of devices of this class.

The characteristics and advantages of the invention are further sufficiently described in connection with the following detail description of the accompanying drawings, which show one exemplifying embodiment of the invention. After considering this, persons skilled in the art will understand that variations may be made within the scope of the invention, and I contemplate the employment of any structures that are within the scope of the appended claims.

In the drawings:

Fig. 1 is a side elevation of sufficient parts of a motor vehicle to show one way in which the invention structure may be applied to a vehicle.

Fig. 2 is a side elevation of the rebound check with part of the cover plate broken away.

Fig. 3 is a longitudinal section showing the details of the structure in one form.

Fig. 4 is a detail view showing one form of irrevoluble connection between the spindle and a friction plate.

Fig. 5 is a detail view showing the relation of a bearing bushing to a movable friction plate.

A fixed member, usually in the form of a plate 1, is adapted for connection to one of two relatively movable parts of the vehicle running gear and this plate is usually secured to one of the chassis side frame members 2. Associated with this plate is a spindle 3, the details of which may vary, but which desirably has a portion 4 closely fitting a hole 5 in plate 1. The spindle member 4 and plate 1 have cooperating flat faces $4^a$ and $5^a$ respectively to lock the spindle irrevolubly to the plate. The spindle has an enlarged outward portion 6 provided with shoulders 7 adjacent to the flat faces $4^a$, these shoulders resting against the outer surface of plate 1.

Plate 1 may be bolted or otherwise secured to the frame member in any suitable way. It is often desirable, however, in order to properly position the device, to space the plate away from the frame web, and for this purpose a spacing member or washer 8 is placed on the shank 9 of spindle 3 between plate 1 and the frame web. Shank 9 passes through a hole bored in the web and a nut 10 engaging a screw-thread 11 on the shank secures the spindle in position and at the same time clamps plate 1 against the spacer 8, in spaced relation to the frame. Plate 1 desirably has an extension or arm $1^a$ of moderate length, and this is spaced from the frame by a spacing washer 12, and a bolt 13 passing through the end of the arm $1^a$, the washer and a hole bored in the frame member 2, secures the plate at another point in spaced relation to the frame and prevents any rotative movement of the plate.

A plate 14 is arranged parallel to plate 1, and the two plates have portions centered about the spindle of ample area to provide suitable friction surfaces. Plate 14 has an extension 15 forming a lever arm of suitable length, and the member 14—15 is conveniently identified in some cases merely as an arm or otherwise as a movable member or movable friction member. At the center of the inward portion of the plate 14 is a hole 16, in which a bearing bushing 17 is inserted with a tight fit. The plate aperture is formed with a plurality of teeth or shallow projections 16$^a$ which engage the bushing to cause it to rotate with the plate. The bushing is mounted to turn about the inward part of the spindle portion 6 and it provides a suitable bearing for the movable plate 14. The bushing may be of metal, but is more desirably of some permanently lubricated type, such as a graphite-impregnated wood bushing.

A friction disk 18 is placed between plates 1 and 14, and another friction disk 19 is placed on the outer surface of the central portion of plate 14, these disks being provided with central holes, which have bearing fits on end surfaces of the bushing 17. The friction disks may be of any suitable material, such as compressed asbestos fabric, or molded friction material. Usually the friction disks are not secured against rotation in respect to any part of the device.

A nut 20, which is conveniently designated in some cases as the pressure chamber, is internally threaded to engage screw threads 21 formed on the outer or large portions 6 of the spindle. These threads are usually of rather steep pitch, the pitch being varied in the design of the device to suit particular operating conditions, some of the factors considered being the mass or inertia of the axle structure, the load capacity and other characteristics of the vehicle spring, and the load normally carried by the chassis frame; in brief the pitch of the screw threads is calculated to give the desired pressure and consequent frictional resistance without having sufficient angularity to produce a locking action. The nut has a flange 21$^a$, the inward face of which bears against the outer face of friction disk 19.

To control the action of the nut or to effect its initial pressure action a spring 22 is provided which acts between the nut and the screw. Specifically in the present example, the spring is in the form of a ribbon bent into a spiral which is normally a flat spiral. At one end the spring has an eye 23 engaged about a screw stud 24 which is screwed into flange 21$^a$ and the other end of the spring has an angular portion 25 engaging a slot 25$^a$ in the outer end of the spindle 3. In placing the spring it is coiled up to give proper rotary tension and is at the same time stretched out along the axis of the spiral so that the contractile tendency of the spring holds its end 25 in the spindle slot without the necessity of a retaining device, although such a device may be provided if necessary or desirable.

The outward portion of the mechanism, including the spring and the outer part of the spindle may be enclosed by a dished cover plate 26 secured to nut flange 21$^a$ by screws 27. In some cases it is unnecessary to protect the edges of the friction disks but when necessary or desirable any suitable coverings may be provided, such as compressible rings or rings of material thinner than the disks 18 and 19 surrounding the peripheries of these disks between plates 1 and 14 and between plate 14 and flange 21$^a$. Cork rings 18$^a$ are used for this purpose, as shown in the drawing.

The end of arm 15 is connected to the axle or an axle fitting by any suitable linkage, which is most desirably a positive linkage. For instance, in the present example the axle 30 is provided with any suitable fitting 31 and the fitting and arm 15 are provided with ball-end members 32 forming universal connections for the socketed ends of a link 33, Fig. 1, this style of universal link connection being desirably employed to avoid any lateral strains on arm 15, although, of course, details of the link connection may vary greatly.

The appliance may be arranged to resist either convergent or divergent movement of the vehicle axle and frame. For example, when arranged as shown in Fig. 3, if the axle is below the frame member 2, the upward movement of the axle in relation to the frame, or in other words, the compression of the vehicle spring, will be resisted. By inverting the device, that is by changing the device as shown in Fig. 3 to the other side of the vehicle, with arm 15 pointing in the same direction, the device will retard the rebound or spring expansion movement. Or, without changing the position of the device, its direction of operation may be changed by removing the screw spindle and nut and substituting others in which the lead of the threads is in the other direction, that is a left hand screw and nut, instead of the right hand screw and nut arrangement shown. The appliance has been found to be very valuable and effective as a rebound retarder and its operation when arranged for that purpose will now be described, and it will be understood after considering this description that it may be arranged and used as a spring compression retarder and will apply resistance to the upward axle movement, instead of the downward or divergent movement of the axle and frame in a similar way, and with a similar free action at the beginning of the retarding operation.

When the device is arranged to check rebound, for instance, as in Fig. 3, supposing that the retarding device is viewed from below, this view-point corresponding to Fig. 1 where the frame member 2 is at the right hand side of the front end of a vehicle, when the road wheel of the vehicle encounters a hump in the road surface which causes the axle to move up in relation to the frame, the link connection causes arm 15 and plate 14 to oscillate about the spindle center. Very slight or negligible frictional resistance is opposed to this movement by the controlling spring 22 acting through the nut. Disk 19 turns along with plate 14 during the vehicle spring compressing movement and by engagement with flange 21$^a$ rotates the nut 20 slightly on the screw with a tendency to relax the slight frictional effect created by the controlling spring. When the vehicle spring compression is completed and the spring commences to return to its normal form, with accompanying divergent movement of the axle and frame 2, arm 15 and plate 14 are moved in the opposite direction and during a small angle of movement of the plate 14 about its axis the frictional engagement of disk 19 with plate 14 and flange 21$^a$ serves to take up any slight play that may exist between the nut and the screw threads 21. Slight frictional engagement is maintained by the spring 22 so that the nut follows the plate 14 and disk 19 in the described movement. As soon as the movement of the nut is reversed and the slight further movement takes up the clearance in the screw threads, the continued turning of the nut upon the screw threads creates active pressure of flange 21$^a$, tending to squeeze the friction surfaces together. There is a moderate degree of movement of plate 14 before the frictional resistance becomes considerable, and this moderate degree of free or substantially free movement permits free action of the vehicle spring as the road wheel passes over small irregularities, which are insufficient to impart any considerable or objectionable rebound effect to the vehicle frame and body. As soon as the clearance has been taken up, as above described, and the nut has turned far enough to squeeze the friction disks between the adjacent plate surfaces, the further movement of arm 15 in the rebound action serves to keep the nut 20 in the same relative position on the screw, and maximum frictional resistance for which the device is designed is thus maintained throughout the rebound movement, this resistance being substantially constant during the entire return movement of the spring, except for the slight free period, above referred to, at the beginning of rebound. At the next compression of the spring the nut is immediately again turned back slightly on the screw and the frictional pressure is relaxed, and so on. It is evident that the device automatically adjusts itself to different amounts of spring deflection, and will always act to check the rebound immediately after the spring commences to return the axle toward normal position and after the arm has passed through the small angle of free movement.

The device automatically compensates for wear until the friction disks have been practically worn out, and they may then be easily replaced by taking off the cover plate 26, disconnecting one end of spring 22, for instance by removing the end 25 of the spring from its notch in the end of the spindle, removing the nut and plate 14, inserting new friction disks, and replacing the parts in an obvious way.

Spring 22 is primarily or principally a controlling element, serving to urge the nut to rotate on the screw in the active direction and maintain moderate pressure between flange 21$^a$ and disk 19.

An important characteristic of the invention is that by the described structure and mode of operation the maximum practicable or desirable retarding resistance is built up practically immediately after the small angle of free movement referred to, is passed, that is, the resistance pressure rises almost instantly to a maximum and is maintained at the maximum throughout the retarded stroke, and no considerable part of the available degree of movement is wasted in building up the maximum pressure. In other words, except for the small desirable free period the device provides the maximum practicable retarding effect.

What I claim is:—

1. A spring check for vehicles comprising a first member adapted to be connected to a vehicle part, a second member mounted for rotation in relation to said first member and having a substantial friction area opposed to a similar area of the first member, a rotatable pressure member frictionally operated by the second member, means controlled by movement of the movable member in one direction by which the pressure member exerts a maximum predetermined pressure on the friction surfaces of said members during substantially the entire movement of the movable member, and means for effecting the initial action of the pressure member.

2. A spring check for vehicles comprising a member adapted to be connected to a vehicle part, a spindle non-rotatably associated with said member, a member mounted for rotation about the spindle and having a substantial area about the spindle opposed to a similar area of the first named member, a rotatable and axially movable pressure member having frictional cooperation with the movable member, means controlled by movement of the movable member in one direction by which the pressure member exerts a maximum predetermined pressure on the friction surfaces of said members during a greater part of the entire movement of the movable member, and yieldable means for effecting the initial action of the pressure member.

3. A spring check for vehicles comprising a plate adapted to be connected to a vehicle frame member, a spindle associated with the plate and secured against rotation, another plate arranged for rotative movement about the spindle, the plates having friction surfaces about the spindle, a nut engaging a screw thread on the spindle and having a member providing a friction surface confronting the second plate, and a spring urging the nut in the active direction.

4. A spring check for vehicles comprising a plate adapted to be connected to a vehicle frame member, a spindle non-rotatively associated with the plate, another plate arranged for rotative movement about the spindle, the plates having friction surfaces about the spindle, a nut engaging a screw thread on the spindle and having a member providing a friction surface confronting the second plate, a spring acting between the nut and the spindle to urge the nut in the active direction, and an arm extending from the second plate arranged for connection to the vehicle axle.

5. A spring check for vehicles comprising a plate adapted to be secured to a vehicle frame member, a spindle non-rotatively associated with the plate at the center of a circular friction surface thereof, another plate arranged for rotative movement about the spindle and having a friction surface substantially commensurate with that of the first plate, a nut engaging a screw thread on the spindle and having a flange providing a friction surface confronting the second plate, friction material between certain of the friction surfaces, and a spring acting between the nut and the spindle to urge the nut in the active direction.

6. A spring check for vehicles comprising a plate adapted to be connected to a vehicle frame member, a spindle irrevolubly associated with the plate at the center of a circular friction surface thereof, another plate arranged for rotative movement about the spindle and having a friction surface substantially commensurate with that of the first plate, a nut engaging a screw thread on the spindle and having a flange providing a friction surface confronting the second plate, friction material between certain of the friction surfaces, a spring acting between the nut and the spindle to urge the nut in the active direction, and an arm on the second plate arranged for connection to a vehicle axle.

7. A spring check for vehicles comprising a plate adapted to be secured to a vehicle frame member, a spindle secured in fixed relation to said plate at the center of a friction surface thereof, a steep-pitch screw thread on the spindle, a nut running on the screw thread and provided with a flange having an inwardly presented friction surface, a spring acting between the nut and spindle to urge the nut to move toward said plate, and a friction plate between said first plate and flange and provided with an arm for connection to the vehicle axle.

8. A spring check for vehicles comprising a plate adapted to be connected to a vehicle frame member, a spindle secured in fixed relation to said plate at the center of a friction surface thereof, a steep-pitch screw thread on the spindle, a nut running on the screw thread and provided with a flange having an inwardly presented friction surface, a spring acting between the nut and spindle to urge the nut to move toward said plate, a friction plate between said first plate and flange and provided with an arm for connection to the vehicle axle, and a housing secured to said flange and enclosing the spring and outer portion of the spindle.

9. A spring check for vehicles comprising a plate adapted to be secured to a vehicle frame member, a spindle secured in fixed relation to said plate at the center of a friction surface thereof, a steep-pitch screw thread on the spindle, a nut running on the screw thread and provided with a flange having in inwardly presented friction surface, a spring acting between the nut and spindle to urge the nut to move toward said plate, a friction plate between said first plate and flange and provided with an arm for connection to the vehicle axle, and friction disks between the first plate and the flange surface and said second plate.

10. A spring check for vehicles comprising a plate adapted to be connected to a vehicle frame member, a spindle secured in fixed relation to said plate at the center of a friction surface thereof, a steep-pitch screw thread on the spindle, a nut running on the screw thread and provided with a flange having an inwardly presented friction surface, a spring connected to the nut and spindle to urge the nut to move toward said plate, a friction plate between said first plate and flange and provided with an arm for connection to the vehicle axle, friction disks between the first plate and the flange surface and said second plate, and a housing secured to said flange and enclosing the spring and outer portion of the spindle.

11. A spring retarder for vehicles comprising a friction plate having an arm adapted to be secured to a vehicle frame, a spindle passing through the plate and secured against rotation in relation to the plate and also secured to the vehicle frame, a steep-pitch screw thread on the outward part of the spindle, a nut mounted on the screw thread and having a flange, another friction plate having a bearing mounting about the spindle and located between the first plate and said flange, friction disks between the flange and the second plate and between the first and second plates, and a spring connected at one end to the nut flange and at the other end to the spindle and serving to urge the nut to rotate on the screw-thread in the active direction.

12. In a spring check for vehicles, the combination of a friction plate, a spindle secured in non-rotative relation thereto, a relatively movable plate mounted to oscillate about the spindle, a revoluble friction flange confronting the movable plate and provided with means cooperating with the spindle to urge it in a direction to clamp the movable plate between the flange and the fixed plate in one direction of movement, and means for effecting initial movement of the flange.

13. In a spring check for vehicles, the combination of a friction plate, a spindle secured in non-rotative relation thereto, an anti-friction bushing rotatively mounted on the spindle adjacent to said plate, a relatively movable plate mounted to revolve with the bushing, a revoluble friction flange confronting the movable plate and provided with means cooperating with the spindle to urge it in a direction to clamp the movable plate between the flange and the fixed plate in one direction of movement, and means for effecting initial movement of the flange.

14. A spring retarder for vehicles comprising an element having a friction surface and adapted to be connected to one of two relatively movable spring-connected parts of a vehicle, another element arranged for relative rotary movement and having a friction surface confronting the friction surface of the first member and arranged for connection to the other of said vehicle parts, a member secured in nonrotative relation to the first named element, a movable pressure member arranged to be frictionally actuated by said second element, said members being provided with cooperating inclined surfaces acting upon movement of said second element in one direction to apply a constant maximum pressure to the friction surfaces to resist vehicle part movement during substantially the entire relative movement of said parts in one direction.

15. A spring retarder for vehicles, comprising an element having a friction surface and adapted to be connected to one of two relatively movable spring-connected parts of a vehicle, another element arranged for relative rotary movement and having a friction surface confronting the friction surface of the first member and arranged for connection to the other of said vehicle parts, a friction disk between the friction surfaces, a member secured in irrevoluble relation to the first named element, a revoluble pressure member arranged to be frictionally actuated by said second element, said members being provided with cooperating inclined surfaces acting upon movement of said second element in one direction after a small degree of free movement to apply a constant maximum pressure to the friction surfaces to resist the entire remaining movement of the vehicle parts in the stated direction.

16. A spring check for vehicles comprising a plate adapted to be connected to a vehicle frame member, a spindle associated with the plate and secured against rotation, another plate arranged for rotative movement about the spindle, the plates having friction surfaces about the spindle, a nut engaging a screw thread on the spindle and having a member providing a friction surface confronting the second plate, and a torsion spring urging the last named member rotatively in the active direction.

17. A spring retarder for vehicles comprising an element having a friction surface and adapted to be connected to one of two relatively movable spring-connected parts of a vehicle another element arranged for relative rotary movement and having a friction surface confronting the friction surface of the first member and arranged for connection to the other of said vehicle parts, a member secured in nonrotative relation to the first named element, a movable pressure member arranged to be frictionally actuated by said second element, said members being provided with cooperating inclined surfaces acting upon movement of said second element in one directon to apply a constant maximum pressure to the friction surfaces to resist vehicle part movement during substantially the entire relative movement of said parts in one direction, and a spring arranged to effect initial action of the pressure member.

18. A spring retarder for vehicles, comprising an element having a friction surface and adapted to be connected to one of two relatively movable spring-connected parts of a vehicle, another element arranged for relative rotary movement and having a friction surface confronting the friction surface of the first member and arranged for connection to the other of said vehicle parts, a friction disk between the friction surfaces, a member secured in irrevoluble relation to the first named element, a revoluble pressure member arranged to be frictionally actuated by said second element, said members being provided with cooperating inclined surfaces acting upon movement of said second element in one direction after a small degree of free movement to apply a constant maximum pressure to the friction surfaces to resist the entire remaining movement of the vehicle parts in the stated direction, and a spring urging the pressure member to frictional engagement with said second element.

19. A vehicle spring controller comprising two relatively rotatable friction members adapted to be connected to parts of a vehicle which are connected by a vehicle spring, a pressure member rotatable in respect to the members first named and operated frictionally upon relative movement of said first members, yieldable means for producing friction pressure between the members, and relatively fixed and movable inclined elements arranged to affect the friction pressure between the members.

20. A vehicle spring controller comprising a first member adapted to be connected to a vehicle part, a second member adapted to be connected to another vehicle part and mounted for rotation in relation to the first member and having a substantial friction area opposed to a friction area of the first member, a rotatable pressure member frictionally operated by the second member, yieldable means for producing friction pressure between the members, and relatively fixed and movable inclined elements acting in one direction of movement of the pressure member to produce friction pressure between the members in co-operation with said yieldable means, and also acting in the other direction of movement to reduce the friction pressure.

21. A vehicle spring controller comprising a first member adapted to be connected to a vehicle part, a second member adapted to be connected to another vehicle part and mounted for rotation in relation to the first member and having a substantial friction area opposed to a friction area of the first member, a rotatable pressure member frictionally operated by the second member, yieldable means for producing friction pressure between the members, and relatively fixed and movable inclined elements arranged to produce friction pressure between the members upon movement of the pressure member and to differently modify the pressure effect of said yieldable means in different directions of movement of the pressure member.

22. A vehicle spring controller comprising two relatively rotatable friction members adapted to be connected to parts of a vehicle which are connected by a vehicle spring, a friction pressure member rotatable in respect to the members first named and operated frictionally upon relative movement of said first members, a spring for producing friction pressure between the members, and relatively fixed and movable inclined pressure-producing elements co-operating with said spring and pressure member.

23. A vehicle spring controller comprising a first member adapted to be connected to a vehicle part, a second member adapted to be connected to another vehicle part and mounted for rotation in relation to the first member and having a substantial friction area opposed to a friction area of the first member, a rotatable pressure member frictionally operated by the second member, a spring for producing friction pressure between the members, and relatively fixed and movable inclined elements acting in one direction of movement of the pressure member to produce friction pressure between the members in co-operation with said spring.

24. A vehicle-spring-action-controlling appliance comprising two relatively movable friction members, yieldable means for urging the member to frictional engagement, and frictionally actuated means acting in one direction of relative movement of the members to amplify the frictional effect, and acting in the other direction of movement to reduce the frictional effect of the yieldable means.

25. A shock absorber for vehicles comprising two relatively movable friction members, yieldable means arranged to urge the members to frictional engagement, and means including an inclined member in fixed relation to one of the friction members and a frictionally actuated pressure member co-operating with said inclined member acting in one direction of relative movement of the friction member to amplify the frictional effect, and acting in the other direction of movement to reduce the frictional effect of the yieldable means.

26. A shock absorber for vehicles comprising two relatively movable friction members, an element fixed against rotation in relation to one of said friction members and having an operating surface inclined to the plane of said member, a movable, frictionally actuated pressure member co-operating with said inclined surface, and a spring tending to amplify the frictional effect produced by the inclined surface in one direction, and the inclined surface tending to reduce the spring effect in the other direction of movement.

27. A shock absorber for vehicles comprising two relatively movable friction plates, an element fixed against rotation in relation to one of said friction members and having an operating surface inclined to the plane of said member, a frictionally actuated pressure member co-operating with said inclined surface, and a spring exerting an effect upon the pressure member tending to amplify the frictional effect produced by the inclined surface in one direction, and the inclined surface acting to reduce the effect of the spring in the other direction of movement.

28. A shock absorber for vehicles comprising a friction plate adapted to be connected to a vehicle member, another relatively movable friction plate adapted to be connected to another relatively movable vehicle member, a member non-rotatively secured in relation to one of the plates, a screw thread on the spindle, a nut engaging the screw thread and having frictional engagement with said movable plate and arranged to urge the plates together, and a thrust spring acting on the nut and exerting pressure urging the nut to active position.

29. In a shock absorber or spring check for vehicles, a first friction plate, a second relatively oscillatable friction plate, a pressure member having frictional engagement with said second plate and arranged to cause application of retarding friction between the first and second plates, a spring tending to urge the pressure member to frictional engagement, and an inclined actuating member in non-rotative relation to the first plate and co-operating with the pressure member so that the pressure member is actuated by frictional engagement with the second plate when the latter is moved in either direction from any operative position, and the spring and inclined member co-operate to apply a maximum frictional retarding effect to the second plate in one direction of movement and a smaller frictional retarding effect in the other direction of movement.

Signed at Hoboken, in the county of Hudson and State of New Jersey, this sixth day of November, A. D. 1922.

CHARLES MARCUS.